United States Patent [19]

Marx

[11] Patent Number: 4,996,840

[45] Date of Patent: Mar. 5, 1991

[54] APPARATUS FOR GENERATING ROTARY MOTION FROM RISE AND FALL MOTION OF WAVES

[76] Inventor: Robert P. Marx, 7 Fairway La., Littleton, Colo. 80123

[21] Appl. No.: 571,401

[22] Filed: Aug. 22, 1990

[51] Int. Cl.⁵ ............................................. F03B 13/22
[52] U.S. Cl. ........................................ 60/507; 60/398; 60/497
[58] Field of Search ................ 60/495, 497, 502, 507, 60/398; 290/53

[56] References Cited

U.S. PATENT DOCUMENTS

| | | | |
|---|---|---|---|
| 3,487,228 | 12/1969 | Kriegel | 290/52 |
| 3,546,473 | 12/1970 | Rich | 290/42 |
| 4,060,344 | 11/1977 | Ootsu | 417/330 |
| 4,271,668 | 6/1981 | McCormick | 60/497 X |
| 4,284,901 | 8/1981 | Giguere | 290/53 |
| 4,341,959 | 7/1982 | Ambli | 290/53 |
| 4,359,868 | 11/1982 | Slonim | 60/497 X |
| 4,413,956 | 11/1983 | Berg | 60/497 X |
| 4,539,485 | 9/1985 | Neuenschwander | 290/53 |
| 4,599,858 | 7/1986 | La Stella et al. | 60/497 |
| 4,754,157 | 6/1988 | Windle | 290/53 |
| 4,773,221 | 9/1988 | Noren | 60/497 X |
| 4,843,249 | 6/1989 | Bussiere | 290/53 |

OTHER PUBLICATIONS

B. M. Court, "Exploiting Wave Power", IEEE Spectrum, Sep. 1979, pp. 42-49.

G. Hagerman & T. Heller, "Wave Energy Assessment for Grid-Connected Utility Applications", Jun. 1988, pp. 1-22.

G. Hagerman, "Wave Energy Resource and Technology Assessment For Coastal North Carolina", Jun. 1988, p. eight.

G. Hagerman & T. Heller, "Wave Energy: A Survey of Twelve Near-Term Technologies", Sep. 1988, 12 pages.

*Primary Examiner*—Allen M. Ostrager
*Attorney, Agent, or Firm*—John R. Flanagan

[57] ABSTRACT

An apparatus for generating rotary motion from rise and fall motion of waves includes an outer hollow sleeve, a float sealably attached across the upper end of the outer sleeve to define an interior cavity, prevent entry of water into the cavity and provide the outer sleeve with sufficient buoyancy to floatably follow up and down motion of waves, an inner hollow sleeve fitted telescopically within the outer sleeve, and an anchoring arrangement attached to the inner sleeve for restraining it from following up and down motion of waves with the outer sleeve and float. The outer sleeve will slidably move up and down relative to the inner sleeve as the outer sleeve and float floatably follow up and down motion of waves and correspondingly will draw a flow of water upwardly and force a flow of water downwardly through the inner sleeve. The apparatus also includes a single rotary motion-producing mechanism mounted within the inner sleeve intersecting and engaging the flow of water through the inner sleeve. The rotary mechanism includes a rotary shaft and a turbine rotor mounted on the shaft for rotation therewith. The rotor has a set of hinged blades being pivotally reversable in their deflected positions in response to change in direction of the flow of water upwardly and downwardly through the inner sleeve for continuously rotating the shaft in a single direction.

20 Claims, 2 Drawing Sheets

APPARATUS FOR GENERATING ROTARY MOTION FROM RISE AND FALL MOTION OF WAVES

BACKGROUND OF THE INVENTION

1. Field of the Invention

The present invention generally relates to wave energy conversion and, more particularly, is concerned with an apparatus for generating rotary motion from rise and fall motion of waves.

2. Description of the Prior Art

One of the more promising renewable sources of energy is ocean waves. Many devices have been proposed in prior art patents and literature for converting the energy of waves into a mechanical motion for performing work, such as generating electricity. In an article appearing in the September 1979 issue of IEEE Spectrum magazine entitled "Exploiting Wave Power", B. M. Count states that the first recorded patent was granted in 1799 to a Frenchman, M. Girard. Count goes on to state that all wave-power inventions to date have been conceptually simple—floats, flaps, sloping ramps or other "wave traps," or stationary air-pressure chambers and similar devices. He cites the emergence of two major categories of devices: dynamically active devices and passive devices. In the active device, the structural elements move in response to the wave, with power being extracted through the relative motion of the elements. A passive arrangement captures the wave energy with a relatively large, immovable structure. Being both bulky and relatively inefficient, passive devices are the least promising among suggested wave-power conversion schemes.

In a paper given in 1988 in Honolulu, Hawaii, entitled "Wave Energy: A Survey of Twelve Near-Term Technologies", investigators George Hagerman and Ted Heller grouped the major technologies for wave power conversion into five categories: heaving devices, heaving and pitching devices, pitching devices, oscillating water columns, and surge devices. Heaving devices use only the vertical motion of floats on waves to stroke various types of pumps. Combined heaving and pitching devices absorb energy from two or more motions of the waves, such as heave, pitch and roll. Pitching devices can be either floating or fixed. An oscillating water column device employs wave-induced motion of an entrained column of seawater as the driving force. Surge devices make use of a wave's forward horizontal force.

Notwithstanding the many different kinds of devices and approaches proposed in the prior art for capturing and converting wave energy to a form of motion for performing useful work, many technical problems still remain in harnessing wave energy. An optimal device has not yet appeared on the horizon.

SUMMARY OF THE INVENTION

The present invention provides an apparatus for generating rotary motion from rise and fall motion of waves, such as in ocean tides. The apparatus employs a pair of relatively slidable inner and outer cylinders or sleeves being telescoped together, and a rotary motion-producing mechanism mounted to the inner sleeve and responsive to flow of water therethrough in each of two opposite directions for generating rotary motion continuously in only a single direction.

A prior art U.S. Pat. No. 4,284,901 to Giguere discloses an apparatus composed of a floating island installed on a column stationarily mounted to the ocean floor. The floating island moves vertically in telescoping fashion relative to the fixed column in response to rise and fall of ocean waves. The apparatus of the Giguere patent has separate water flow circuits through the top portion of the column which are used alternately for rotatably driving separate turbines mounted on the same shaft. One circuit is used when the island floats upward causing flow of water upwardly therethrough, whereas the other circuit is used when the island floats downward causing flow of water downwardly therethrough. Check valves are interposed in the circuits to prevent reversal of the direction of water flow through the circuits.

In contrast thereto, the apparatus of the present invention employs a single rotary motion-producing mechanism that will be rotated in only one direction by flow of water in either direction through the inner sleeve and the rotary mechanism. In one exemplary embodiment, the mechanism is a turbine rotor having a set of radial pivotally reversable hinged blades.

Accordingly, the present invention is directed to an apparatus for generating rotary motion from rise and fall motion of waves, comprising: (a) a first hollow tubular member having upper and lower opposite open ends; (b) a float sealably attached across the upper end of the first tubular member so as to define an interior cavity therewith and prevent entry of water through the upper end of the first tubular member into the cavity, the float also providing the first tubular member with sufficient buoyancy to floatably follow up and down motion of waves with the float when the float and first tubular member are disposed in a body of water; (c) a second hollow tubular member having top and bottom opposite open ends and fitted telescopically with the first tubular member, the second tubular member defining a flow path for water from the bottom open end of the second tubular member to the cavity of the first tubular member and float; (d) means attached to the second tubular member for restraining the second tubular member from following up and down motion of waves with the first tubular member so as to cause the first tubular member to slidably move up and down relative to the second tubular member as the first tubular member and float floatably follow up and down motion of waves and correspondingly draw a flow of water upwardly into the cavity from along the flow path through the second tubular member and force a flow of water downwardly from the cavity along the flow path through the second tubular member; and (e) a single rotary motion-producing mechanism mounted within the second tubular member in engagement with the flow of water through the second tubular member, the rotary mechanism being capable of rotating in a single direction in response to flow of water both upwardly and downwardly through the second tubular member and against the rotary mechanism.

The rotary motion-producing mechanism includes a shaft having an axis of rotation, and means for rotatably mounting the shaft to the second tubular member so as to extend through the second tubular member for rotation of the shaft about the axis. Also, the rotary mechanism includes a driving member having a hub mounted to the shaft for rotation therewith, a plurality of spokes mounted to the hub and displaced about and extending radially from the hub, and a set of blades each being hingedly mounted to one of the spokes so as to permit pivoting of the blade about the respective spoke between a pair of angularly displaced positions in response to a change in the direction of flow of water through the second tubular member. The blade in each of the respective positions opposes the flow of water in the particular direction along the flow path through the second tubular member so as to produce revolution of the blade and continuous rotation of the shaft in the one direction about the axis of the second tubular member in response to flow of water in each of the opposite directions through the second tubular member.

More particularly, the second tubular member is an inner cylinder or sleeve and the first tubular member is an outer cylinder or sleeve telescopically inserted over the inner sleeve and reciprocally movable along the inner sleeve. The second tubular member also includes an interior annular body portion attached to the inner sleeve and forming a central passage through the inner sleeve which defines the water flow path. The interior annular body portion of the inner sleeve defines a flotation cell which provides buoyancy to the second tubular member. The driving member of the rotary mechanism is mounted by the rotary shaft within the interior annular body portion of the inner sleeve with the set of blades extending radially outward across the central passage. The restraining means includes an anchor resting stationarily within the body of water and a tether interconnecting the anchor and the second tubular member for permitting the second tubular member and rotary mechanism to sway horizontally to accommodate the driving force of a passing wave while restraining the second tubular member from moving up with the motion of the passing wave.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
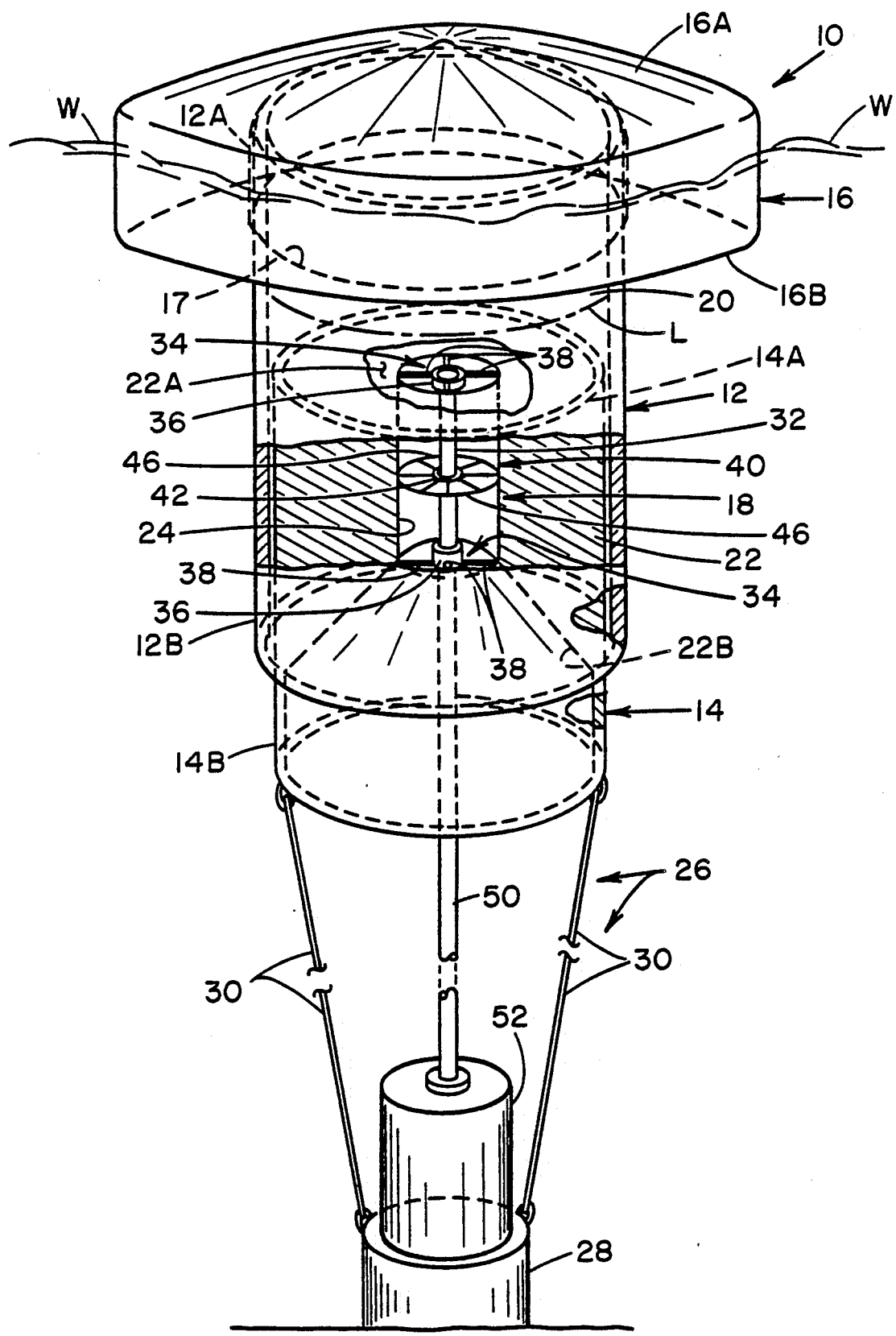
FIG. 1 is a perspective view, with portions broken away and sectioned, of a rotary motion generating apparatus of the present invention.

Referring to the drawings, and particularly to FIG. 1, there is shown an apparatus, generally designated 10, for generating rotary motion from rise and fall motion of waves W in accordance with the principles of the present invention. In its basic components, the rotary motion generating apparatus 10 includes a pair of hollow tubular members 12 and 14, a float 16 mounted to the upper portion of the one tubular member 12, and a single rotary motion-producing mechanism 18 mounted within the other tubular member 14.

Preferably, the tubular members 12 and 14 of the apparatus 10 are in the form of outer and inner cylinders or sleeves, which each have upper and lower opposite open end portions 12A, 12B and 14A, 14B. The outer sleeve 12 fits telescopically over the inner sleeve 14. The internal diameter of the outer sleeve 12 is slightly greater than the external diameter of the inner sleeve 14 so that the outer sleeve 12 can slide in a reciprocatory manner along the outside surface of the inner sleeve 14.

The float 16 is in the form of an annular body of larger diameter than the outer sleeve 12 and having a generally conical-shaped upper surface 16A and annular conical-shaped lower surface 16B. The float body 16 can be hollow and filled with air or be solid and composed of a material less dense than water. The float body 16 has a central opening 17 at its lower surface 16B through which extends the upper open end portion 12A of the outer sleeve 12. The float body 16 is sealably attached at the interior side of its upper surface 16A to the upper end portion 12A of the outer sleeve 12 so as to define an interior cavity 20 therewith and prevent entry of water through the upper end 12A of the outer sleeve 12 into the cavity 20. The float 16 is sufficiently lightweight compared to the volume of water it displaces so as to provide itself and the outer sleeve 12 with sufficient buoyancy to floatably follow the up and down motion of waves W in a body of water.

The inner sleeve 14 has an interior annular body portion 22 attached to the interior cylindrical surface 14C of the inner sleeve 14 intermediately between its opposite upper and lower ends 14A, 14B. The interior annular body portion 22 defines a central passage 24 through the inner sleeve 14. The annular body portion 22 has upper and lower annular surfaces 22A and 22B of conical shapes converging toward one another to the central passage 24 which function to funnel the flow of water to the passage. Also, the interior annular body portion 22 of the inner sleeve 14 can be solid and composed of a material less dense than water, or can be hollow forming a sealed annular cavity filled with air. In either case, the annular body portion 22 defines a flotation cell which provides a certain amount of buoyancy to the inner sleeve 14.

In order to ensure relative motion between the outer and inner sleeves 12 and 14 in response to the rise and fall motion of the waves W, the inner sleeve 14 is held generally stationary in the body of water with respect to the vertical direction. To achieve this, the apparatus 10 also includes means in the form of an anchoring or mooring arrangement 26 attached to the inner sleeve 14 which restrains it from following the up and down motion of the outer sleeve 12 and float 16 as caused by the corresponding motion of the waves. In one exemplary form, the anchoring arrangement 26 is a platform or anchor 28 resting stationarily within the body of water, and a tether or rod 30 interconnecting the anchor 28 and the lower end 14B of the inner sleeve 14. The inner sleeve 14 is permitted by the anchoring arrangement 26 to sway from side-to-side horizontally to accommodate the driving force of a passing wave while, at the same time, being restrained by the arrangement 26 from moving upward with the motion of the passing wave. With the inner sleeve 14 so restrained, the outer sleeve 12 will slidably reciprocate or move up and down relative to the inner sleeve 14 as the outer sleeve 12 and float 16 floatably follow and are carried up and down between crest and trough elevations of the wave by the motion of wave.

Upward movement of the outer sleeve 12 and float 16 relative to the stationary inner sleeve 14 from the position of FIG. 1, as the outer sleeve 12 and float 16 are carried with the ascending crest of a wave, expands the volume of the interior cavity 20 defined by the outer sleeve 12 and float 16 generally above the level L of the water within the inner sleeve 14. Expansion of the volume of the cavity 20 creates a partial vacuum condition within the expanded volume which draws or sucks a flow of water upwardly through the central passage 24 of the annular body portion 22 of the inner sleeve 14. The creation of the partial vacuum condition between the float 16 and outer sleeve 12 and the water level L in the inner sleeve 14 limits the amount of ascent of the outer sleeve 12 and float 16 relative to the inner sleeve 14 so as to prevent the outer sleeve 12 from slipping off the inner sleeve 14.

Downward movement of the outer sleeve 12 and float 16 relative to the stationary inner sleeve 14 from the position of FIG. 1, as the outer sleeve 12 and float 16 are carried with the descending trough of the wave, contracts the volume of the cavity 20 defined by the outer sleeve 12 and float 16 above the level L of the water within the inner sleeve 14. This forces a flow of water downwardly through the passage 24 of the annular body portion 22 of the inner sleeve 14 and from the open lower end 14B thereof. The buoyancy of the inner sleeve 14 tends to maintain its stability in the water and limit the maximum amount the outer sleeve 12 and float 16 can descend in the water.

Figure 2:
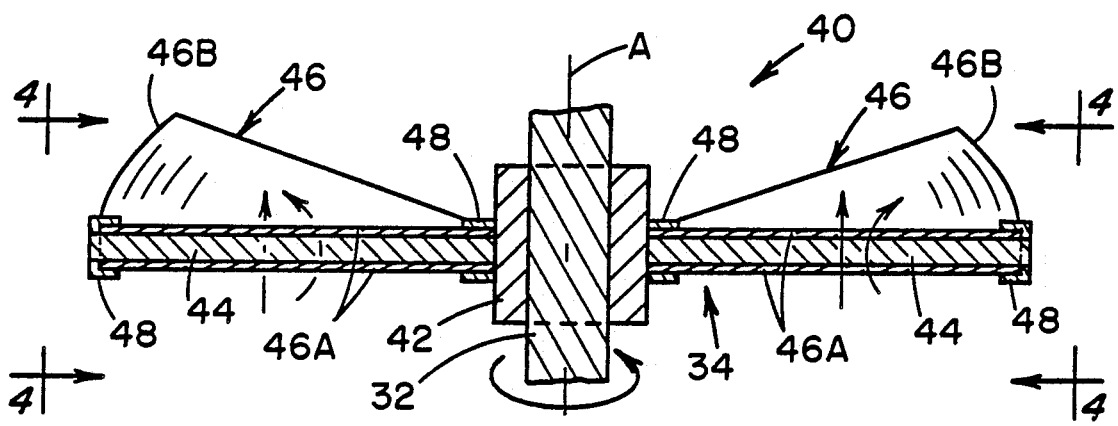
FIG. 2 is an axial sectional view of a rotary motion producing mechanism of the apparatus of FIG. 1, illustrating an upwardly deflected position of a set of reversable hinged blades on a central rotary shaft of the mechanism when water flows upwardly through the apparatus.
Figure 3:
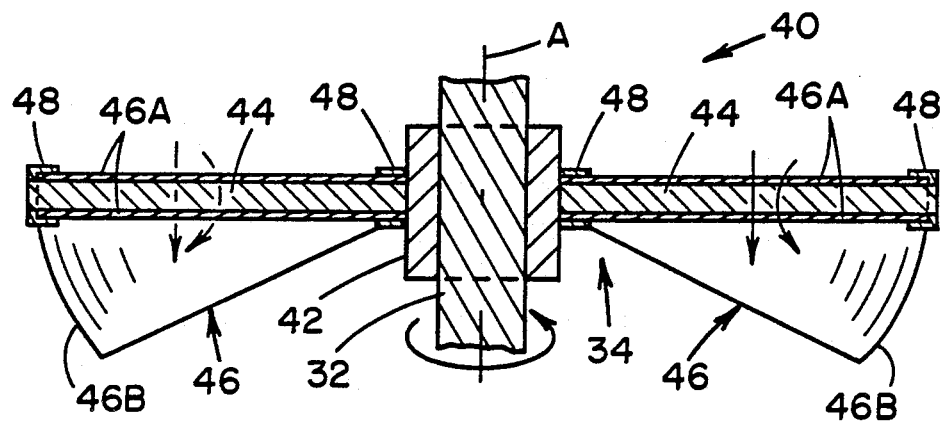
FIG. 3 is the same view of the mechanism as shown in FIG. 2, except illustrating the downwardly deflected position of the set of blades when water is flowing downwardly through the apparatus.

Referring to FIGS. 2 and 3, there is illustrated the rotary motion-producing mechanism 18 of the apparatus 10 which is mounted within the central passage 24 of the interior annular body portion 22 of the inner sleeve 14, as seen in FIG. 1. In such location, it intersects the flow of water through the central passage 24 of the inner sleeve 14. The rotary mechanism 18 is capable of rotating in a single direction in response to flow of water both upwardly and downwardly through the central passage 24 of the inner sleeve 14.

More particularly, the rotary mechanism 18 includes an enlongated shaft 32 having an axis A of rotation, and a pair of spider-like structures 34 which rotatably mount the shaft 32 through the passage 24 of the inner sleeve 14. Each structure 34 includes a bearing 36 and a plurality of streamlined struts 38 connected to the bearing 36. The struts 38 of each structure 34 extend radially from the bearing 36 and are connected to the annular body portion 22 so as to stationarily mount the bearings 36 in axial alignment with one another, positioning the rotary shaft 32 coaxially through the passage 24.

Figure 4:
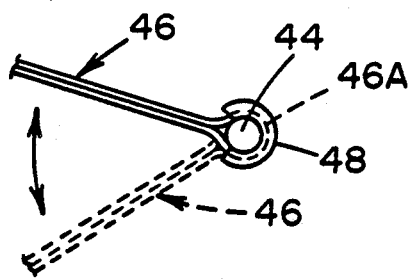
FIG. 4 is an end view of a blade of the mechanism as seen along line 4—4 of FIG. 2.

Also, the rotary mechanism 14 includes a driving member 40 in the form of a propeller of rotor. The rotor 40 has a central hub 42 mounted to the rotary shaft 32 for rotation therewith, a plurality of spokes 44 mounted to the hub 42 and displaced circumferentially about and extending radially from the hub 42 and with respect to axis A of the shaft 32. A set of blades 46 are hingedly mounted to the respective spokes 44 so as to pivot about the spokes between a pair of angularly displaced positions shown respectively in FIGS. 2 and 3, and in solid and dashed lines in FIG. 4, in response to a change in the direction of flow of water through the central passage 22 of the inner sleeve 14. A pair of stops 48 having generally C-shaped configurations are fixedly mounted at the opposite ends of the spokes 44 and overlie opposite edges of the hinge portions 46A of the blades 46 so as to limit the blades 46 to about a 30° deflection in either direction away from the horizontal position shown in FIG. 1.

FIG. 2 illustrates an upwardly deflected position of the blades 46 when water flows upwardly through the central passage 22. FIG. 3 illustrates a downwardly deflected position of the blades 46 when water is flowing downwardly through the central passage 22. The blades 46 change deflected positions in response to the change in direction of the flow of water through the passage 22 but only deflect about 30° due to the presence of the stops 48 so that in each of the respective positions the blades 46 are engaged by and oppose the flow of water in the given direction through the inner sleeve central passage 22. Opposition to the flow of water by the blades 46 causes the flowing water to drive the blades 46 and produce revolution of the blades 46 and rotation of the shaft 32 continuously in the one direction about the axis A of the central passage 22 of the inner sleeve 14 irrespective of the particular direction of flow of water through the inner sleeve 14. In the illustrated example, the rotor 40 has eight flat blades 46, each defining a 45° arc at the outer edge 46B thereof.

Although not part of the present invention, the rotary shaft 32 can be coupled to any suitable mechanism for converting the rotary motion of the shaft 32 into another motion for use in producing work. In FIG. 1, the rotary shaft 32 is shown coupled by a vertical extension shaft 50 to an electrical generator 52 mounted on the platform or anchor 28.

In summary, passing crests and troughs of waves make the float 16 rise and fall (go up and down) with the wave which, in turn, causes the outer sleeve 12 to slidably move vertically and cyclically up and down relative to the more or less stationarily-held inner sleeve 14. The up and down reciprocal movement of the outer sleeve 12 alternately draws water upwardly through the inner sleeve 14 by creation of suction forces in the cavity 20 and forces water downwardly through the inner sleeve 14. The blades 46 are deflected between their up and down positions in response to change in direction of the water flow through the passage 24. Irregardless of the deflected position of the blades 46 and the direction of water flow through the inner sleeve 14, the blades 46 continue to rotary the shaft 32 in the same direction.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An apparatus for generating rotary motion from rise and fall motion of waves, comprising:
 (a) a first hollow tubular member having upper and lower opposite open ends;
 (b) a float sealably attached across said upper end of said first tubular member so as to define an interior cavity therewith and prevent entry of water through said upper end of said first tubular member into said cavity, said float also providing said first tubular member with sufficient buoyancy to floatably follow up and down motion of waves with said float when said float and first tubular member are disposed in a body of water;

(c) a second hollow tubular member having top and bottom opposite open ends and fitted telescopically with said first tubular member, said second tubular member defining a flow path for water from said bottom open end of said second tubular member to said cavity of said first tubular member and float;

(d) means attached to said second tubular member for restraining said second member from following up and down motion of waves with said first member so as to cause said first tubular member to slidably move up and down relative to said second tubular member as said first tubular member and float floatably follow up and down motion of waves and correspondingly draw a flow of water upwardly into said cavity from along said flow path through said second tubular member and force a flow of water downwardly from said cavity along said flow path through said second tubular member; and (e) a single rotary motion-producing mechanism mounted within said second member in engagement with the flow of water through said second tubular member, said rotary mechanism being capable of rotating in a single direction in response to flow of water both upwardly and downwardly through said second member and against said rotary mechanism.

2. The apparatus of claim 1 wherein said rotary mechanism includes:
a shaft having an axis of rotation; and
means for rotatably mounting said shaft to said second tubular member so as to extend through said second tubular member for rotation of said shaft about said axis.

3. The apparatus of claim 2 wherein said rotary mechanism further includes a driving member having:
a hub mounted to said shaft for rotation therewith;
a plurality of spokes mounted to said hub, said spokes displaced about and extending radially from said hub and said axis of said shaft; and
a set of blades each being hingedly mounted to one of said spokes so as to permit pivoting of said blade about said respective spoke between a pair of angularly displaced positions in response to a change in the direction of flow of water through said second tubular member, said blade in each of said respective positions opposing and engaging the flow of water in the particular direction through said second tubular member so as to produce revolution of said blades and rotation of said shaft in the one direction about said axis in response to flow of water in each of said opposite directions through said second tubular member.

4. The apparatus of claim 1 wherein said second tubular member is an inner sleeve and said first tubular member is an outer sleeve telescopically inserted over said inner sleeve and reciprocally movable along said inner sleeve.

5. The apparatus of claim 1 wherein said second tubular member includes an interior annular body portion forming a central passage through said second tubular member which defines said water flow path.

6. The apparatus of claim 5 wherein said annular body portion has upper and lower annular surfaces of conical shapes converging toward one another to said for funneling the flow of water to said passage.

7. The apparatus of claim 5 wherein said annular body portion of said second tubular member defines a flotation cell providing buoyancy to said second tubular member.

8. The apparatus of claim 5 wherein said single rotary mechanism is mounted to said second tubular member within said interior annular body portion thereof across said central passage therethrough.

9. The apparatus of claim 1 wherein said first and second tubular members are outer and inner cylinders.

10. The apparatus of claim 1 wherein said restraining means is an anchoring arrangement which includes:
an anchor for resting stationarily within the body of water;
means interconnecting said anchor and said second tubular member for permitting said second tubular member to sway horizontally to accommodate the driving force of a passing wave while restraining said second tubular member from moving up with the motion of the passing wave.

11. An apparatus for generating rotary motion from rise and fall motion of waves, comprising:
(a) an outer hollow sleeve having an open bottom end and a closed top end and an upper interior cavity, said outer sleeve having sufficient buoyancy to floatably follow up and down motion of waves when said outer sleeve is disposed in a body of water;
(b) an inner hollow sleeve having top and bottom opposite open ends and fitted telescopically within said outer sleeve such that said outer sleeve is reciprocally movable relative to said inner sleeve, said inner sleeve defining a flow path for water from said bottom open end of said second tubular member to said cavity of said outer sleeve, said inner sleeve including an interior annular body portion forming a central passage which defines said water flow path, said annular body portion of said inner sleeve providing buoyancy to said inner sleeve;
(c) means attached to said inner sleeve for restraining said inner sleeve from following up and down motion of waves with said outer sleeve so as to cause said outer sleeve to slidably move up and down relative to said inner sleeve as said outer sleeve floatably follows up and down motion of waves and correspondingly draws a flow of water upwardly into said cavity from along said flow path through said passage of said inner sleeve and forces a flow of water downwardly from said cavity along said flow path through said passage of said inner sleeve; and
(d) a single rotary motion-producing mechanism mounted within said interior annular body portion of said inner sleeve across said central passage therethrough and in engagement with the flow of water through said passage said rotary mechanism being capable of rotating in a single direction in response to flow of water both upwardly and downwardly through said passage and against said rotary mechanism.

12. The apparatus of claim 11 wherein said rotary mechanism includes:
a shaft having an axis of rotation; and
means for rotatably mounting said shaft to said inner sleeve so as to extend through said passage of said inner sleeve annular body portion for rotation of said shaft about said axis.

13. The apparatus of claim 12 wherein said rotary mechanism includes a driving member having a set of blades pivotal between a pair of angularly displaced positions in response to a change in the direction of flow of water through said passage of said inner sleeve, said blades in each of said respective positions opposing and engaging the flow of water in the particular direction through said passage so as to produce revolution of said blades and rotation of said shaft in the one direction about said axis in response to flow of water in each of said opposite directions through said passage.

14. The apparatus of claim 13 wherein said driving member further has a hub mounted to said shaft for rotation therewith, and a plurality of spokes mounted to said hub, said spokes displaced about and extending radially from said hub and said axis of said shaft, said blades being hingedly mounted to said respective spokes.

15. The apparatus of claim 11 wherein said restraining means is an anchoring arrangement which includes:
   an anchor for resting stationarily within the body of water;
   means interconnecting said anchor and said inner sleeve for permitting said inner sleeve to sway horizontally to accommodate the driving force of a passing wave while restraining said inner sleeve from moving up with the motion of the passing wave.

16. An apparatus for generating rotary motion from rise and fall motion of waves, comprising:
   (a) a pair of inner and outer sleeves fitted telescopically together for sliding movement relative to one another, said outer sleeve having an hollow interior and sufficient buoyancy to floatably follow up and down motion of waves when disposed in a body of water, said inner sleeve having a hollow interior passage defining a flow path for water through said inner sleeve from an open bottom thereof to said hollow interior of said outer sleeve;
   (b) means attached to said inner sleeve for restraining said inner sleeve from following up and down motion of waves with said outer sleeve so as to cause said outer sleeve to slidably move up and down relative to said inner sleeve as said outer sleeve floatably follows up and down motion of waves and to correspondingly draw a flow of water upwardly into said interior of said outer sleeve through said passage of said inner sleeve and force a flow of water downwardly from said interior of said outer sleeve through said passage of said inner sleeve; and
   (c) a single rotary motion-producing mechanism mounted within said inner sleeve across said passage thereof and in engagement with the flow of water through said passage, said rotary mechanism being capable of rotating in a single direction in response to flow of water both upwardly and downwardly through said passage and against said rotary mechanism.

17. The apparatus of claim 16 wherein said rotary mechanism includes:
   a shaft having an axis of rotation; and
   means for rotatably mounting said shaft to said inner sleeve so as to extend through said passage of said inner sleeve annular body portion for rotation of said shaft about said axis.

18. The apparatus of claim 17 wherein said rotary mechanism includes a driving member having a set of blades pivotal between a pair of angularly displaced positions in response to a change in the direction of flow of water through said passage of said inner sleeve, said blades in each of said respective positions opposing and engaging the flow of water in the particular direction through said passage so as to produce revolution of said blades and rotation of said shaft in the one direction about said axis in response to flow of water in each of said opposite directions through said passage.

19. The apparatus of claim 18 wherein said driving member further has a hub mounted to said shaft for rotation therewith, and a plurality of spokes mounted to said hub, said spokes displaced about and extending radially from said hub and said axis of said shaft, said blades being hingedly mounted to said respective spokes.

20. The apparatus of claim 16 wherein said restraining means is an anchoring arrangement which includes:
   an anchor for resting stationarily within the body of water;
   means interconnecting said anchor and said inner sleeve for permitting said inner sleeve to sway horizontally to accommodate the driving force of a passing wave while restraining said inner sleeve from moving up with the motion of the passing wave.

* * * * *